United States Patent
Zernickel

(10) Patent No.: US 6,979,127 B2
(45) Date of Patent: Dec. 27, 2005

(54) BEARING ELEMENT FOR A LINEAR GUIDE

(75) Inventor: Alexander Zernickel, Herzogenaurach (DE)

(73) Assignee: INA-Schaeffler KG, (DE)

( * ) Notice: Subject to any disclaimer, the term of this patent is extended or adjusted under 35 U.S.C. 154(b) by 84 days.

(21) Appl. No.: 10/475,625

(22) PCT Filed: Mar. 28, 2002

(86) PCT No.: PCT/EP02/03484

§ 371 (c)(1),
(2), (4) Date: Oct. 20, 2003

(87) PCT Pub. No.: WO02/088558

PCT Pub. Date: Nov. 7, 2002

(65) Prior Publication Data
US 2004/0151407 A1 Aug. 5, 2004

(30) Foreign Application Priority Data
Apr. 27, 2001 (DE) ................................ 101 20 828

(51) Int. Cl.$^7$ ............................................. F16C 29/06
(52) U.S. Cl. ...................................................... 384/45
(58) Field of Search .............................. 384/43–45, 49, 384/19

(56) References Cited

U.S. PATENT DOCUMENTS

| 4,240,673 A | * | 12/1980 | Ernst et al. | 384/44 |
| 4,576,422 A | | 3/1986 | Laszlo et al. | |
| 4,799,806 A | * | 1/1989 | Seki | 384/45 |
| 4,806,022 A | | 2/1989 | Takahiro | |
| 5,094,549 A | * | 3/1992 | Lyon | 384/44 |
| 5,640,768 A | * | 6/1997 | Teramachi | 384/45 |

FOREIGN PATENT DOCUMENTS

| DE | 3303831 | 8/1983 |
| DE | 3422444 | 12/1985 |
| DE | 3627169 | 3/1987 |
| DE | 4223499 | 1/1994 |
| DE | 4318427 | 12/1994 |
| DE | 3607633 | 8/1997 |
| FR | 1454315 | 7/1966 |

* cited by examiner

Primary Examiner—Thomas R. Hannon
(74) Attorney, Agent, or Firm—Charles A. Muserlian

(57) ABSTRACT

A bearing element for a linear roll guide comprises a carrier body in which a channel (7) for load-bearing rolling elements (8), a return channel (4) for returning rolling elements (5) and two arc-shaped deflecting channels, that connect said channels to each other for accommodating rolling elements to be deflected, are incorporated. According to the invention, the carrier body is made in the form of a thin-walled housing bushing (1) in which a first plastic insert (3) that guides the rolling elements (5) is arranged.

8 Claims, 4 Drawing Sheets

BEARING ELEMENT FOR A LINEAR GUIDE

FIELD OF THE INVENTION

The invention concerns a bearing element for a linear roll guide comprising a carrier body in which a straight channel for load-bearing rolling elements, a straight return channel for returning rolling elements and two arc-shaped deflecting channels, that connect said channels to each other for accommodating rolling elements to be deflected, are incorporated.

The use of a compact design of such a bearing element is conceivable both in general mechanical engineering and in the field of automotive technology.

BACKGROUND OF THE INVENTION

The publication DE 42 23 499 A1 shows a bearing element configured as a recirculating roller shoe that comprises a solid carrier body. This is supported through cylindrical rolling elements on a raceway of a guide rail. The load-bearing rolling elements are arranged behind one another in a channel of the carrier body that extends in the direction of travel of the carrier body. The cylindrical rolling elements or rollers form an endless circuit, a further channel for receiving the returning rolling elements being arranged in the solid carrier body. However, due to the large material requirement for the solid carrier body, this is an expensive construction.

SUMMARY OF THE INVENTION

The object of the invention is to provide an economic, compact and ready-to-mount bearing element assembly that is largely independent of tolerances during mounting and positioning in a reception housing.

This object is achieved according to the invention by the fact that the carrier body is made in the form of a thin-walled housing bushing with a first plastic insert arranged therein for guiding the rolling elements. In such a structure, no special demands are made on the design and realization of the reception housing. The housing bushing can be a non-machined shaped component, and the rolling elements can be configured as cylindrical rollers or as cylindrical needles. For their mechanical retention, the cylindrical needles may be provided with conical end caps.

A further (second) plastic insert can also be arranged in the housing bushing, so that the plastic inserts are situated on both sides of a bushing bottom. The return channel can be formed with the first plastic insert, and the channel for the load-bearing rolling elements can be formed with the second plastic insert.

In addition to the first plastic insert, a metal insert can also be arranged in the housing bushing for forming the channels for the rolling elements. In a modified embodiment of the invention, the carrier body can be configured in the form of a hardened extrusion molded part with plastic inserts arranged therein for guiding the rolling elements.

BRIEF DESCRIPTION OF THE DRAWING

Examples of embodiment of the invention are represented in the drawing and will be described more in the following. In the drawing.

DETAILED DESCRIPTION OF THE DRAWING

Figure 1:
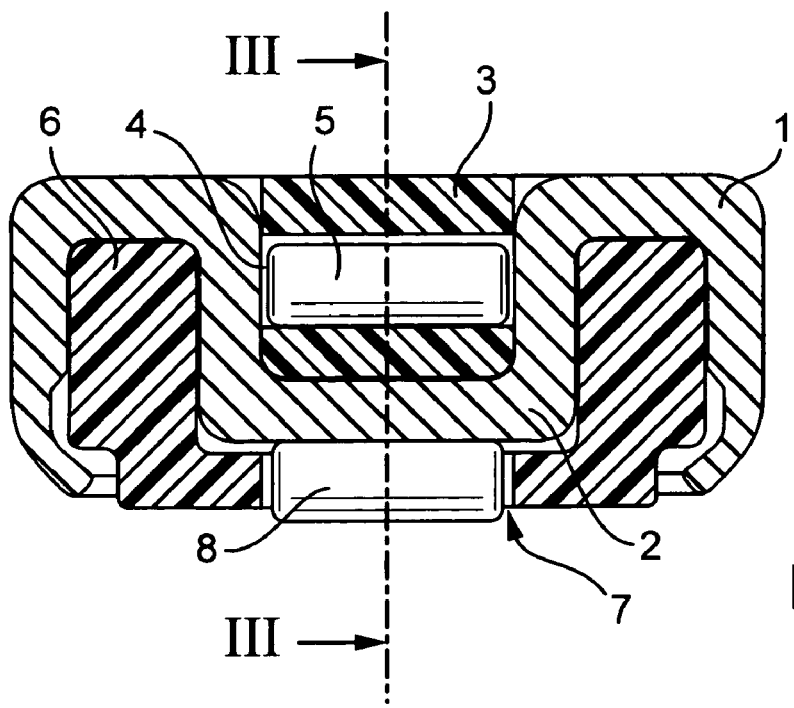
FIG. 1 is a longitudinal section through a bearing element of the invention, in a first form of embodiment.
Figure 2:
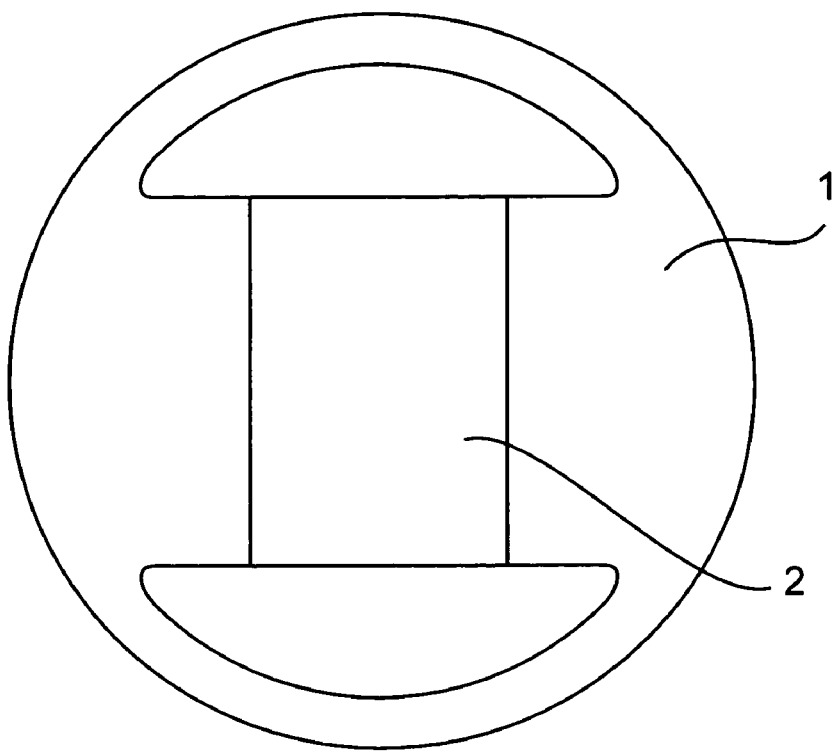
FIG. 2 is a top view of the housing bushing of the bearing element of FIG. 1, but without plastic inserts.
Figure 3:
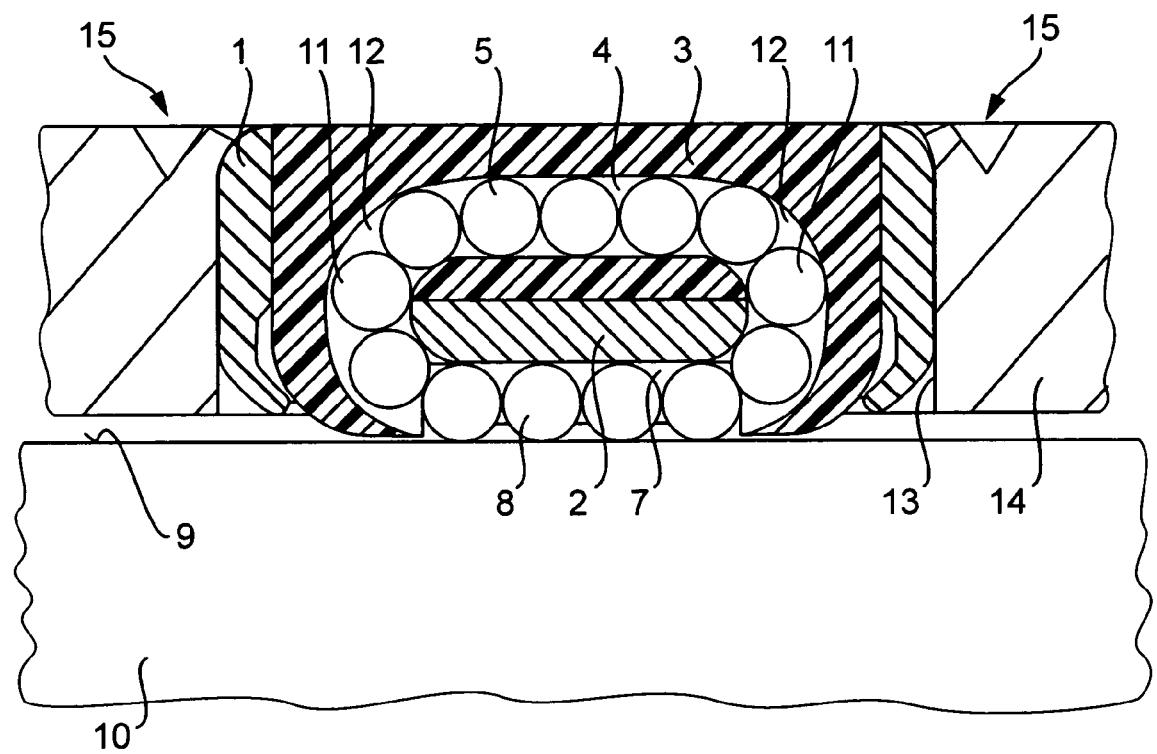
FIG. 3 is a longitudinal section through the bearing element along line III—III of FIG. 1, the bearing element being arranged in a reception housing and supported on a guide rail.

The bearing element shown in FIGS. 1 to 3 comprises a thin-walled housing bushing 1 having a circular cross-section, in whose interior, a bushing bottom 2 is formed. A first plastic insert 3 inserted into the housing bushing 1 is situated on one side of the bushing bottom and comprises a straight return channel 4 for receiving returning rolling elements 5. A second plastic insert 6 likewise inserted into the housing bushing 1 forms a straight channel 7 for load-bearing rolling elements 8 which bear against the other side of the bushing bottom 2 for rolling thereon.

The bearing element is supported through the load-bearing rolling elements 8 on the linear running surface 9 of a guide rail 10 for longitudinal displacement thereon. At each of its ends, the row of load-bearing rolling elements 8 merges with respective rolling elements 11 to be deflected that are arranged in arc-shaped deflecting channels 12 of the first plastic insert 3 and lead to the row of returning rolling elements 5 in the return channel 4. In this way, an endless circuit of rolling elements is formed in the bearing element.

The rolling elements are configured as cylindrical rollers or cylindrical needles. The bearing element is arranged in a bore 13 of a reception housing 14 and fixed there through swaged regions 15 of the reception housing. Made as a hardened needle bushing, the housing bushing 1 is the load-supporting element. The raceway formed by the bushing bottom 2 for the load-bearing rolling elements 8 is not made by machining.

The bearing element is pressed into the bore 13 of the reception housing 14 till it reaches the contact position with the linear running surface 9. The fixing of the bearing element in the reception housing 14 can also be effected with a Seeger circlip ring. With this procedure, it is possible to work independently of tolerances, for example, if a force-path controlling system is used.

Advantageously, the housing bushing 1 is configured with a circular cross-section because this shape offers the greatest stability, so that the housing bushing can also rigidify the reception housing 14, and this is important particularly in the case of thin-walled or torque-transmitting reception housings. A further advantage of this compact bearing element is that it can be mounted at any point in the reception housing, for example, wherever it is possible to provide a bore for the bearing element.

As a rule, no additional design space is required for accommodating the bearing element. Depending on the load rating or the rigidity, several bearing elements may be required for guiding the linear running surface 9 and the reception housing 14 relative to each other. In place of the circular shape, it is also conceivable to configure the bearing housing with other shapes, for example, with an oval or a quadrilateral shape.

Figure 6:
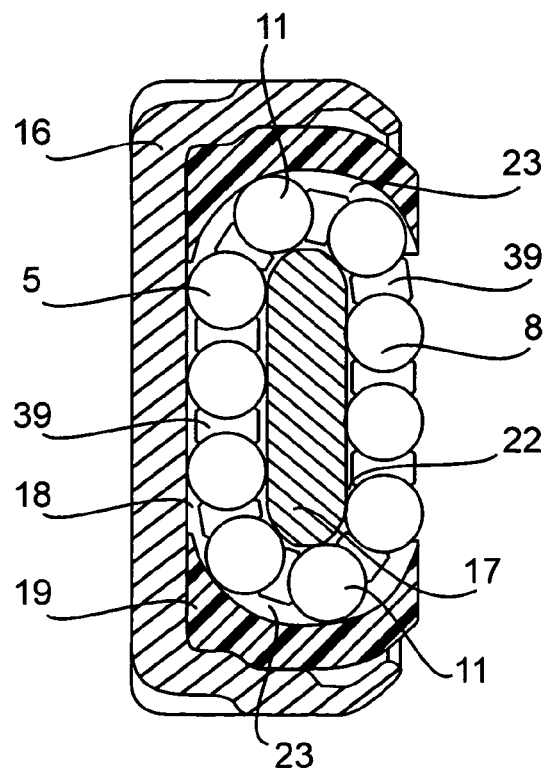
FIG. 6 is a longitudinal section along line VI—VI of FIG. 4 through the bearing element, but with separators for guiding the rolling elements.
Figure 4:
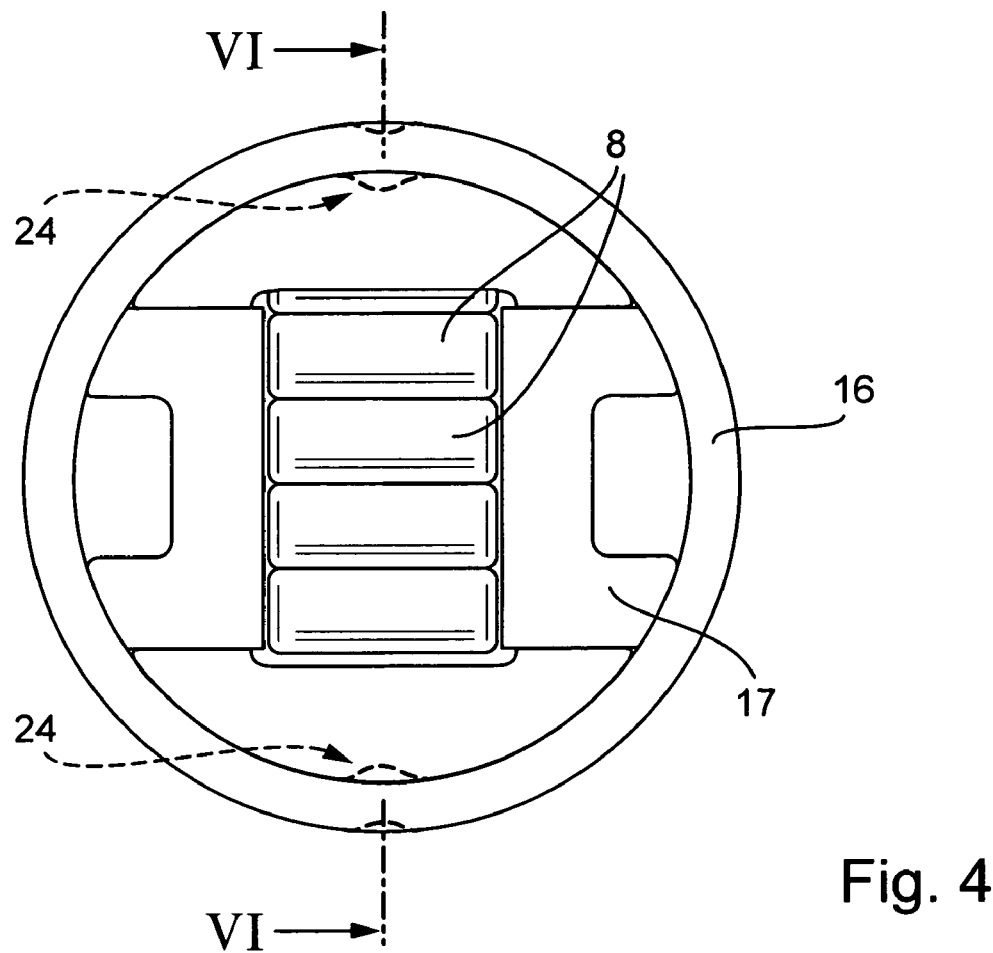
FIG. 4 is a bottom view of a bearing element of the invention in a second form of embodiment.
Figure 5:
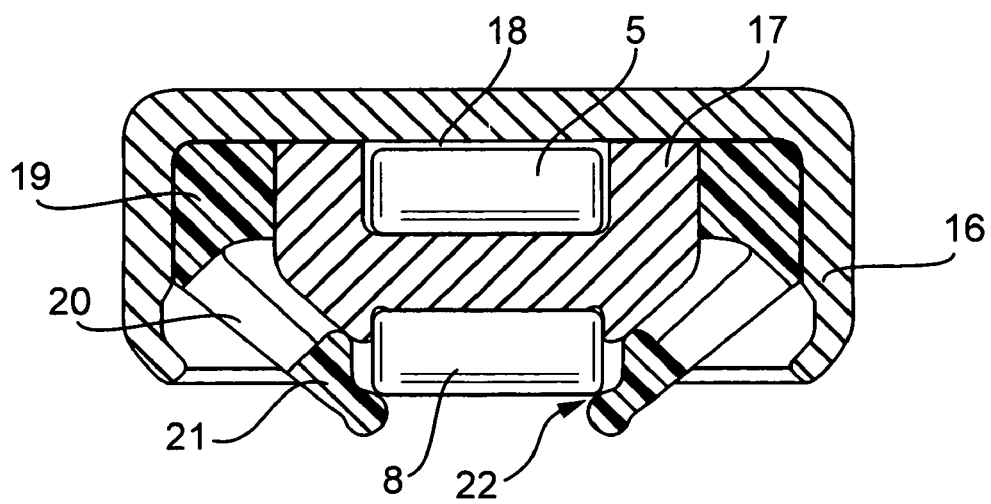
FIG. 5 is a longitudinal section through the bearing element of FIG. 4 with additionally shown spring elements and tongues.

In the bearing element represented in FIGS. 4 to 6, the thin-walled housing bushing 16 has a simpler configuration and comprises a metal insert 17, for example, an extrusion molded part, which, together with the bottom of the housing bushing 16, forms a straight return channel 18 for the returning rolling elements 5. The housing bushing 16 further comprises a first plastic insert 19. Springs 20 with tongues 21 are formed on this insert to serve for the retention of the load-bearing rolling elements 8. For the load-bearing rolling elements 8, the bearing element further comprises a straight channel 22 formed by a bottom of the metal insert 17 and the tongues 21. In the retention of the load-bearing rolling elements 8, the tongues 21 that engage around the rolling elements recede resiliently into the housing bushing 16 as soon as the bearing element is seated on the running surface 9. They spring out again when the bearing element is lifted off the running surface 9.

Together with the bottom region of the metal insert 17, the plastic insert 19 further forms two arc-shaped deflecting channels 23 for the rolling elements 11 to be deflected. Depressions 24 are provided in the housing bushing 16 to enable the orientation of the housing bushing 16 in the reception housing 14. The housing bushing 16 protects the rolling elements and their channels from dirt accumulation. The housing bushing does not always have to be a metal part, but may also be made of plastic.

Figure 7:
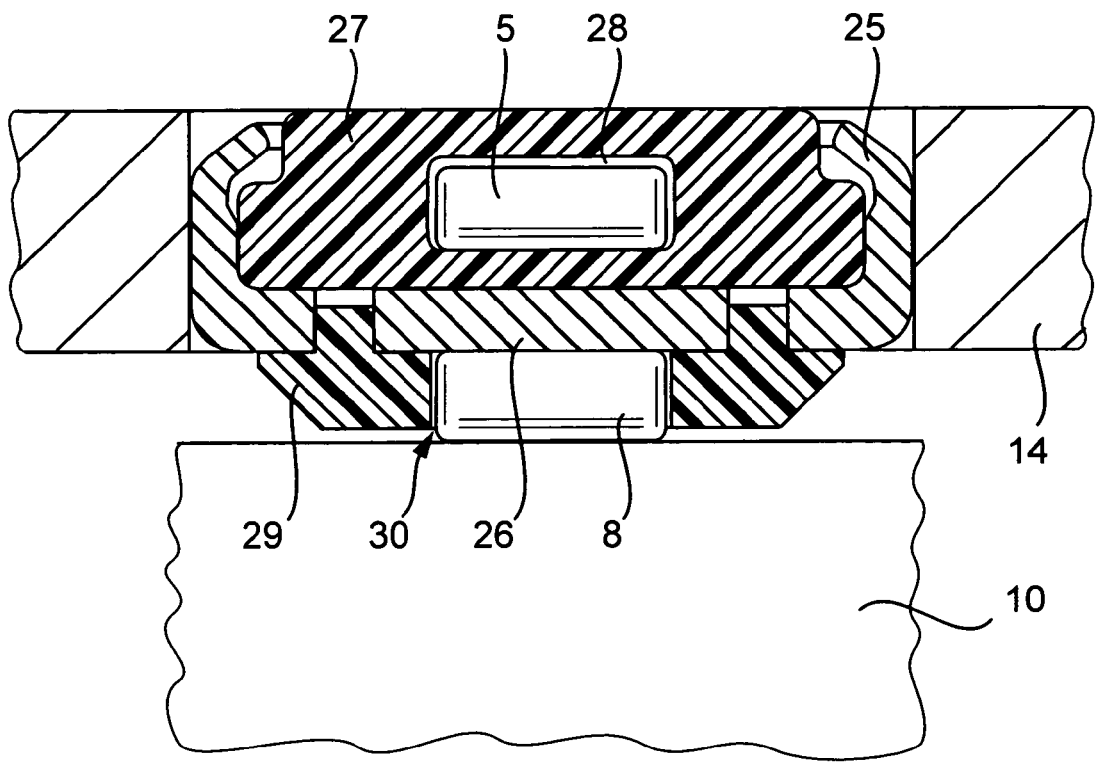
FIG. 7 is a longitudinal section through a bearing element of the invention in a third form of embodiment.

FIG. 7 shows a bearing element comprising a housing bushing 25 which is disposed in the reception housing 14 in a reversed arrangement compared to the housing bushing 1 of FIG. 3. In the embodiment of FIG. 7, the load-bearing rolling elements 8 are supported on the outer side of the bushing bottom 26. This embodiment has the advantage that less shaping is required in the fabrication of the housing bushing 25. A first plastic insert 27 comprising a straight return channel 28 for the returning rolling elements 5 is situated within the housing bushing 25, while a second plastic insert 29 is inserted with insertion portions into recesses of the housing bushing 25 and bears against the outer side of the bushing bottom 26. Together with the bushing bottom 26, the second plastic insert 29 forms the straight channel 30 for the load-bearing rolling elements 8.

Figure 8:
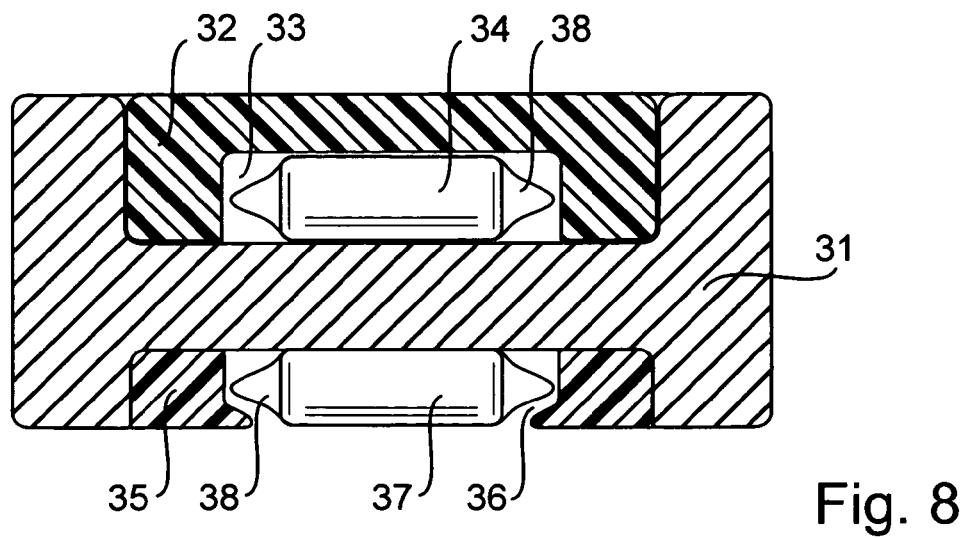
FIG. 8 is a longitudinal section through a bearing element of the invention in a fourth form of embodiment.

FIG. 8 shows that it is also possible to use an extrusion molded part 31 in place of a deep-drawn hardened housing bushing. In this embodiment, a first plastic insert 32 forms the straight return channel 33 for the returning rolling elements 34, and a second plastic insert 35 forms the straight channel 36 for the load-bearing rolling elements 37. All the rolling elements are made as cylindrical needles comprising conical end caps 38.

FIG. 6 shows a classical retention of the rolling elements 5, 8 and 11 by separators 39. This arrangement is, however, effected at the expense of the number of load-bearing rolling elements that can be accommodated.

LIST OF REFERENCE NUMERALS

1 Housing bushing
2 Bushing bottom
3 First plastic insert
4 Return channel
5 Returning rolling elements
6 Second plastic insert
7 Channel for load-bearing rolling elements
8 Load-bearing rolling elements
9 Linear running surface
10 Guide rail
11 Rolling elements to be deflected
12 Deflecting channel
13 Bore
14 Reception housing
15 Swaged region
16 Housing bushing
17 Metal insert
18 Return channel
19 First plastic insert
20 Spring
21 Tongue
22 Channel for load-bearing rolling elements
23 Deflecting channel
24 Depression
25 Housing bushing
26 Bushing bottom
27 First plastic insert
28 Return channel
29 Second plastic insert
30 Channel for load-bearing rolling elements
31 Extrusion molded part
32 First plastic insert
33 Return channel
34 Returning rolling elements
35 Second plastic insert
36 Channel for load-bearing rolling elements
37 Load-bearing rolling elements
38 Conical cap
39 Separator

What is claimed is:

1. A bearing element for a linear roll guide comprising a carrier body in which a straight channel (7, 22, 30) for load-bearing rolling elements (8), a straight return channel (4, 18, 28) for returning rolling elements (5) and two arc-shaped deflecting channels (12, 23), that connect said channels to each other for accommodating rolling elements (11) to be deflected, are incorporated, characterized in that the carrier body is made in the form of a thin-walled housing bushing (1, 16, 25) in which a first plastic insert (3, 19, 27) that guides the rolling elements (5, 11) is arranged whereas the thin walled housing bushing (1, 16, 25) has a u-shaped section with a bushing bottom (2, 26) and two side walls, and the u-shaped section contains the return channel (4, 18, 28) at one side of the bushing bottom (2, 26), and the rolling elements (11) bear against the other side of the bushing bottom (2, 26) for rolling thereon.

2. A bearing element according to claim 1, characterized in that the rolling elements (5, 8, 11) are cylindrical rollers.

3. A bearing element according to claim 1, characterized in that the rolling elements (5, 8, 11) are cylindrical needles.

4. A bearing element according to claim 1, characterized in that a second plastic insert (6, 29) is arranged in the housing bushing (1, 25), and the first and second plastic inserts (3, 27, and 6, 29) are situated on two sides of a bushing bottom (2, 26).

5. A bearing element according to claim 4, characterized in that the return channel (4, 28) is formed with the first plastic insert (3, 27), and the channel (7, 30) for the load-bearing rolling elements (8) is formed with the second plastic insert (6, 29).

6. A bearing element according to claim 5, characterized in that, in addition to the first plastic insert (19), a metal insert (17) that forms the channels (18, 22, 23) for the rolling elements (5, 8, 11) is arranged in the housing bushing (16).

7. A bearing element for a linear roll guide comprising a carrier body in which a straight channel (36) for load-bearing rolling elements (37), a straight return channel (33) for returning rolling elements (34) and two deflecting channels, that connect said channels to each other for accommodating rolling elements to be deflected, are incorporated, characterized in that the carrier body is made in the form of a hardened extrusion molded part (31) in which plastic inserts (32, 35) are arranged for guiding the rolling elements (34, 37).

8. A bearing element according to claim 7, characterized in that the rolling elements (34, 37) are configured as cylindrical needles that comprise conical end caps (38) that serve to mechanically retain said cylindrical needles.

* * * * *